Dec. 1, 1936.  J. J. REID  2,062,609
FUMIGATING GAS GENERATOR
Filed Aug. 29, 1933   2 Sheets-Sheet 1
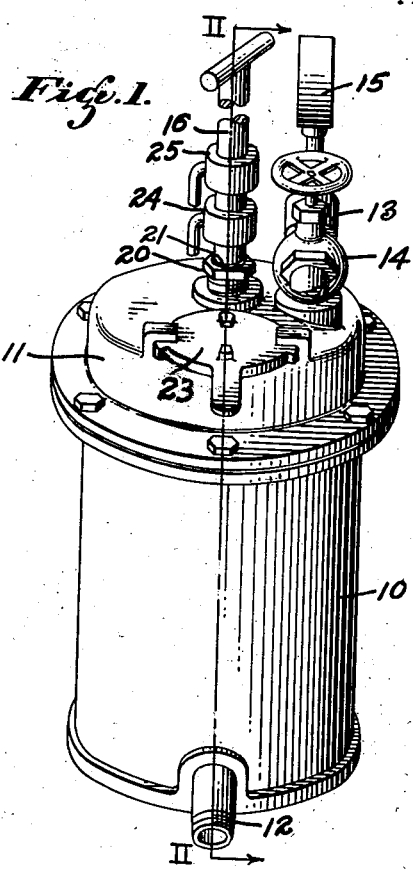
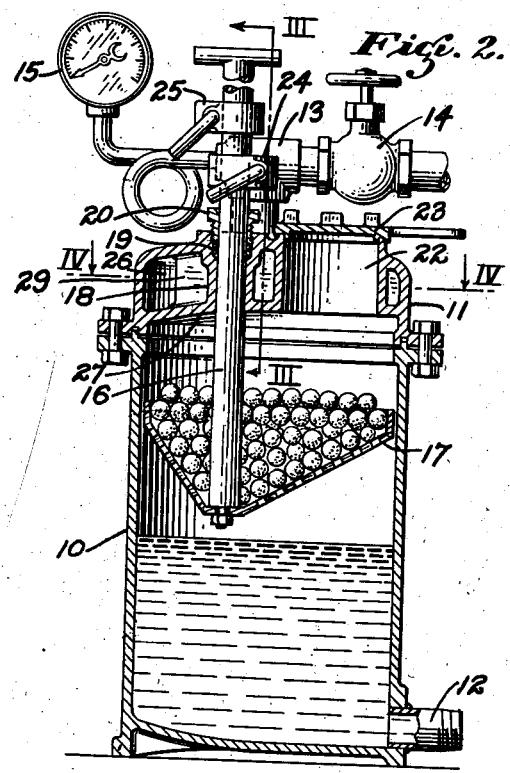
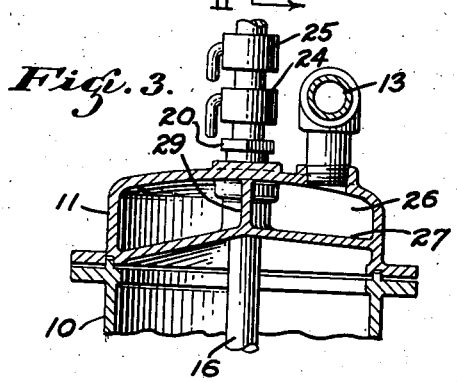
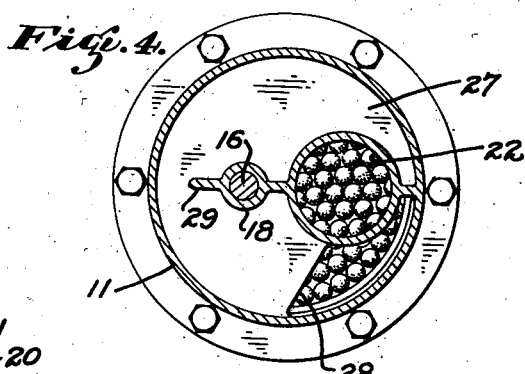
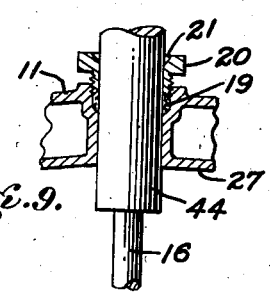
INVENTOR.
James J. Reid.
BY
Wm. H. Atkinson
ATTORNEY.

Dec. 1, 1936.  J. J. REID  2,062,609
FUMIGATING GAS GENERATOR
Filed Aug. 29, 1933  2 Sheets-Sheet 2
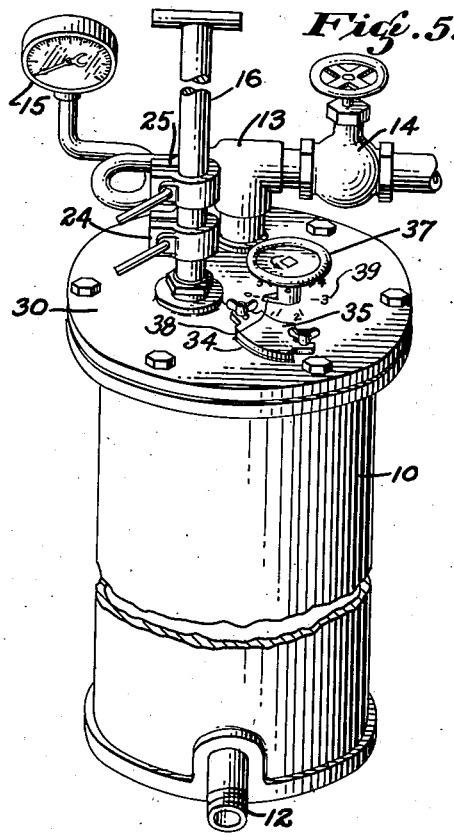
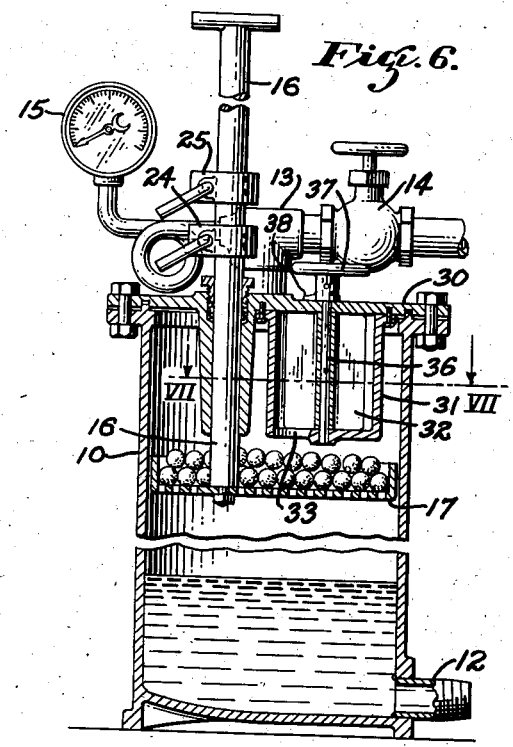
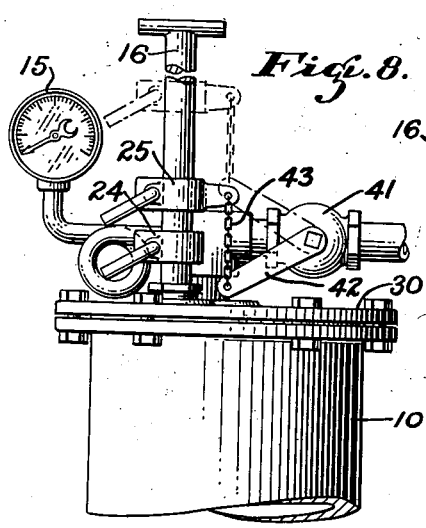
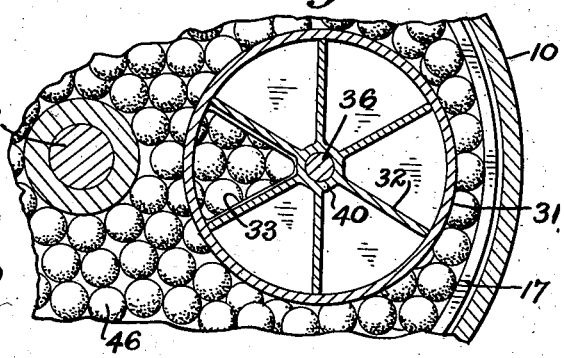
INVENTOR.
James J. Reid.
BY
Wm H. Atkinson
ATTORNEY.

Patented Dec. 1, 1936

2,062,609

UNITED STATES PATENT OFFICE 2,062,609

FUMIGATING GAS GENERATOR

James J. Reid, San Francisco, Calif., assignor to Cyanide Generator Company, Inc., Portland, Oreg., a corporation of Oregon Application August 29, 1933, Serial No. 687,270

4 Claims. (Cl. 23—282)

My present invention relates to apparatus for generating a fumigating gas and more particularly to an improved form of generator in which the gas producing ingredients may be deposited in a sealed container and subsequently placed into chemical contact with each other to effect a generation of gas, and wherein means is provided to separate the ingredients and stop the generation of gas when the pressure within the sealed container reaches a predetermined value.

An object of my invention is to provide an apparatus for generating a fumigating gas which will be efficient and safe in its operation.

A further object of my invention is to provide, in a fumigating gas generator, means which will permit a mixing of the gas producing ingredients in a container after it has been sealed and effect a separation of the gas producing ingredients when the pressure of the generated gas reaches a predetermined value.

In my prior Patent Number 1,806,823, issued May 26, 1931, entitled Gas generator, I disclosed an apparatus for successively generating measured quantities of a fumigating gas in which segregated amounts of one gas producing ingredient can be dropped into another gas producing ingredient to effect a generation of gas within a sealed container from which the gas can be conducted to the area being fumigated. However, in this apparatus no provision is made to stop the evolution of gas until the chemical reaction between the mixed gas producing ingredients is completed and as a result it is necessary to anticipate in advance just how much of at least one of the active gas producing ingredients will be required to produce the desired amount of fumigating gas.

The apparatus of my present invention differs from that disclosed in my prior patent in that it will permit a mixing of the gas producing ingredients in a sealed container and a manual separation thereof to stop the generation of gas when a sufficient volume of gas has been generated to fumigate the particular area for which it is intended, or an automatic separation of the gas producing ingredients when the pressure of the gas within the sealed container reaches a predetermined value.

In carrying out my invention, in its preferred form, I provide a sealed container for a liquid gas producing ingredient and mount a second container, in which a soluble gas producing ingredient may be disposed, upon a piston like support within said sealed container so that the soluble gas producing ingredient may be submerged in said liquid gas producing ingredient and automatically withdrawn therefrom by said piston like support when the pressure produced in said sealed container, by the generation of gas, reaches a predetermined value.

For a better understanding of my invention reference should be had to the accompanying drawings wherein;

Figure 1 is a perspective view showing a preferred form of generator,

Figure 2 is a vertical sectional view of the generator taken along line II—II of Figure 1 looking in the direction of the arrows, Figure 3 is a fragmentary sectional view taken along line III—III of Figure 2 looking in the direction of the arrows, Figure 4 is a horizontal sectional view taken along line IV—IV of Figure 2, Figure 5 is a perspective view of another form of my invention, Figure 6 is a vertical sectional view of the generator shown in Figure 5, Figure 7 is an enlarged sectional view taken along line VII—VII of Figure 6 looking in the direction of the arrows, Figure 8 is a fragmentary view in elevation showing a further detail of my invention, and Figure 9 is a fragmentary sectional view of a modified detail of my invention.

As illustrated in Figures 1, 2, 3, and 4 of the drawings, my improved generator, in its simplest form, consists of a tank or container 10 having a removable cover or top 11 which can be secured thereupon to complete a sealed enclosure. At the bottom of the tank 10 there is a drainage outlet 12 which in practice will have a suitable closure valve (not shown). The cover 11 is provided with a gas outlet conduit 13 having a valve 14 for controlling the flow of the fumigating gas to its point of application. The conduit 13 also carries a suitable pressure gauge 15 which communicates with the interior of the tank 10 and operates to indicate the pressure of the gas as it is generated and discharged through the valve 14.

Projecting through the cover 11 and fitted therein so that it will slide freely, I show a piston like support 16 which carries a perforated partition or container 17 at its lower end. With this arrangement the container 17 can be raised and lowered within the tank 10, as will hereinafter appear.

Surrounding the piston like support 16, where it extends through the cover 11, there is a suitable guide bearing 18, and a packing 19 which serves to prevent the escape of gas at this point.

The packing 19 is shown as compressed by a packing nut 20 which may be tightened and/or loosened to determine the freedom of movement of the piston like support 16 through the cover 11. The nut 20 is scarfed away, as at 21, to facilitate the application of a lubricant to the surface of the piston like support 16. The cover 11 has a hand hole 22 through which the gas producing ingredients may be deposited in the generator and a readily removable lid 23 is provided for closing the hand hole 22 when the generator is in use.

In order to hold the container 17 and its piston like support 16 in an inactive or raised position, as when the generator is being charged or during transportation, there is provided a suitable clamping collar 24 which can be clamped tightly about the piston like support 16 immediately above the packing nut 20. A second and similar clamping collar 25 is also mounted upon the piston like support 16 above the clamping collar 24. The latter clamping collar 25 can be adjusted and fixed at any point along the piston like support 16 to limit its downward movement and thus control the mixing of the gas producing ingredients.

The cover 11 is cored out, as at 26, so as to provide a baffle 27 to prevent the discharge of vapor from the generator should a violent ebullition occur. As shown in Figure 4 of the drawings, the baffle 27 has an aperture 28 through which the generated gas may flow to the outlet conduit 13. Cooperating with the baffle 27, to complete the baffling arrangement, there is a vertical rib 29 which, in conjunction with the wall of the hand hole opening 22, forms a partition extending part way across the cover 11. This partition provides a tortuous path through which the gas must pass in flowing from the interior of the tank or container 10 to the outlet conduit 13.

In Figures 5 and 6 of the drawings, there is illustrated a generator constructed in accordance with another form of my invention. This generator has a charging arrangement somewhat similar to that disclosed in my above referred to prior patent. In this embodiment of my invention the tank 10 has a cover 30 which, in addition to forming a bearing for the piston like support 16, and carrying the outlet conduit 13, its control valve 14 and the gauge 15, also has a partitioned container 31 from which segregated quantities of a gas producing ingredient may be discharged into the generator, to effect a recharging as the active ingredients are used up, without necessitating an opening of the generator.

In its preferred form, the container 31 consists of a cylindrical housing having a plurality of vertically and radially extending rotatable partitions 32 that form compartments, in which segregated quantities of a solid gas producing ingredient may be disposed, and from which the ingredient can be successively discharged through a suitably located outlet 33 in the bottom thereof.

The disposition of the container 31 below the cover 30, as shown, will necessitate a sufficient spacing between the liquid in the tank 10 and the cover 30 to eliminate the possibility of vapors escaping from the generator and therefore the cover may be formed without the baffling arrangement, previously described as provided in the cover 11. While the container 31 is shown as secured to the underside of the cover 30, which is the preferred arrangement, it is to be understood that it may be mounted above the cover if desired. In this latter event the discharge outlet 33 will be continued through the cover 30.

To facilitate a charging of the container 31 with its gas producing ingredient, after the generator is assembled, the cover 30 is provided with a suitable opening 34, over which a closure plate 35 can be secured in sealing engagement. This opening 34 is so disposed with relation to the outlet 33 that the several compartments formed by the partitions 32, with the exception of one, may be successively filled without permitting a discharge of the contents of any of the filled compartments into the generator. In order to rotate the partitions 32 and thus discharge the gas producing ingredient held therebetween, these partitions are secured to a vertically extending shaft 36 that projects through the cover 30 where a hand wheel 37 is secured thereto. The hub of the hand wheel 37 has a pointer 38 that registers with an index 39 upon the cover to thus indicate the position of the several compartments with respect to the discharge outlet 33.

As illustrated in Figure 7 of the drawings, the partitions 32 are formed as radially extending fins disposed in equally spaced relation about a hub 40 to which the shaft 36 is secured. It will be noted that, as here illustrated, one of the compartments formed between two of the partitions 32 is in register with the outlet 33. When the parts are in this position the first compartment progressing counter-clockwise from the opening 33 will be in register with the opening 34 in the cover 30 so that this compartment can be filled. After this compartment is filled the hand wheel 37 can be turned counter-clockwise to bring the next compartment into register with the opening 34 and in this manner the container 31 can be completely charged, except for the one compartment which must remain empty over the outlet 33 to prevent a discharge of its contents into the generator before it is required. If desired this latter compartment may be blanked off at the top so as to prevent an inadvertent charging thereof. However, in some instances it may be desirable to charge all of the compartments with the solid gas producing ingredient and permit the first charge to drop through the outlet 33 and upon the perforated partition or container 17, where it will be held out of contact with the liquid ingredient until the piston like support 16 is either forced or permitted to drop down into the generator.

In Figure 8 of the drawings, the generator is shown as equipped with an "on" and "off" valve 41 having a lever 42 which moves between two positions to open and/or close the valve. The end of this lever 42 is connected by means of a chain 43 with the clamping collar 25 so that, when the length of the chain 43 and the position of the collar 25 are properly adjusted, the upward movement of the piston like support 16 may be utilized to either open or close the valve 41, as determined by the construction of the valve and conditions under which the generator is operating.

When the piston like support 16 has a diameter varying from one inch to one and one-half inch, pressures varying anywhere from fifty pounds per square inch and upward can be automatically controlled by regulating the pressure on the packing 19. If the generator is to be used to generate gas at lower pressures, the piston action obtained with the piston like support 16 can be improved by enlarging the diameter of the support 16, between the limits of its travel through the cover 11, as shown at 44 in Figure 9 of the drawings.

The generator can be made of any size and is designed primarily for the generation of hydrocyanic acid gas for the destruction of various pests such as are prevalent in ships, warehouses, grain bins and freight and refrigerator cars. Owing to the deadly character of the gas, the generator should, for safety, be set up out of doors. Therefore, when in use the generator will be equipped with a hose of sufficient length to conduct the gas to the space to be fumigated.

In charging the generator for the production of hydrocyanic acid gas, I prefer to use a solution of sulphuric acid and water as one of the ingredients and sodium cyanide in briquette form as another of the ingredients. These briquettes of cyanide are sold in the open market under the name of "Cyanegg" and weigh approximately one ounce apiece. A good fumigating gas for the above uses can be obtained by mixing about ten of the "Cyanegg" briquettes with fifteen ounces (avoirdupois) acid and fifteen ounces (avoirdupois) water for each thousand cubic feet of space to be fumigated. In other words, by weight the mixture will consist of one part cyanide to three parts of the acid and water solution.

In the operation of the generator, a good routine to follow is to first close the valve 14 and then place the discharge end of the gas conducting hose into the room or compartment to be fumigated. The generator can now be charged by first introducing the acid and water solution and then the "Cyanegg" through the hand hole 22. After the generator has been thus charged the generation of gas can be started by pushing the piston like support 16 downward into the generator until the sodium cyanide contacts with the acid solution. This will permit the chemical reaction necessary for the generation of the gas. When the pressure of the gas within the container 10 has reached a value sufficient to overcome the weight carried by the piston like support 16 and the resistance to movement produced by the packing 19, the container 17 will be raised and separate the gas producing ingredients to thus stop the generation of gas. The valve 14 can then be opened and, by observing the pressure drop on the gauge 15, any desired amount of the gas can be discharged into the compartment to be fumigated. After the compartment has been supplied with the required amount of gas the valve 14 will be closed and the discharge end of the conducting hose can then be transferred to another compartment. This operation can be repeated until all of the gas is used. Should an insufficient amount of gas be generated during the first chemical reaction the supply can be replenished by pushing the container 17 and its support 16 downward to effect a further generation of gas. This procedure can be repeated until all of the active gas producing ingredients have been used up. In practice I provide an excess of the acid and water solution and proceed in the above manner until all of the sodium cyanide is dissolved.

When the generator is not in use the piston like support 16 and the container 17 will be raised to their uppermost positions and the clamping collar 24 will be tightened about the support 16 immediately above the packing nut 20. This will prevent a mixture of the ingredients as long as the generator remains in its normal upright position.

When the piston like support 16 and the container 17 are in their lower positions the rate of gas generation will be determined by the amount of submergence of the sodium cyanide in the acid. The amount of submergence can be controlled by the operator by fixing the clamping collar 25 upon the piston like support 16 at a point which will stop the downward movement of the support 16 and the container 17 when the latter has entered the acid to the desired degree.

The generation of gas will begin as soon as the sodium cyanide contacts with the upper surface of the acid and therefore, under normal operating conditions, it is contemplated that the downward movement of the container 17 will be stopped at this point. As the sodium cyanide is dissolved it will slowly settle in the container 17 and when the gas pressure has reached a predetermined value the piston like support 16 will be raised and separate the remaining undissolved sodium cyanide from the acid and thus automatically stop the generation of gas and prevent an excessive pressure being built up in the generator.

Instead of relying upon the piston like support 16 to stop the generation of gas, it is also contemplated that the operator may manually move the support down and then raise it when a sufficient gas pressure is recorded upon the gauge 15. This procedure will be found particularly useful when very small compartments or areas are to be successively fumigated, as would be the case should the generator be used in fumigating the compartments of a ship or a train of freight cars in which grain has been or is to be shipped.

The operation of the generator, illustrated in Figures 5 and 6 of the drawings, will be similar to the above, with the additional feature that, as the sodium cyanide in the container 17 is dissolved, fresh quantities of the sodium cyanide may be dropped into the container 17 without dismantling the generator and thus delaying the fumigating operation. In other words, when the generator is equipped with a charging container 31 it will be possible to provide a maximum of six distinct charges of sodium cyanide or other gas producing ingredient that can be successively mixed with the acid and water solution, an excess amount of which will, under normal conditions, be originally placed in the container 10.

While I have, for the sake of clearness and in order to disclose the invention so that the same can be readily understood, described and illustrated specific devices and arrangements, it is to be understood that this invention is not limited to the specific means disclosed but may be embodied in other ways that will suggest themselves to persons skilled in the art. It is believed that this invention is broadly new and it is desired to claim it so that all such changes as come within the scope of the appended claims are to be considered as part of this invention.

Having thus described my invention, what I claim and desire to secure by Letters Patent is—

1. An apparatus for generating a fumigating gas comprising, a tank adapted to contain a liquid gas producing ingredient, a cover for said tank having a vertically disposed elongated guide bearing, a vertically movable piston forming rod disposed in said bearing, a basket like receptacle for holding a second gas producing ingredient disposed about and secured at its bottom to the end of said rod, the diameter of said rod being substantially larger than that required to support said basket like receptacle, whereby it will act as a piston to raise the basket like receptacle when a predetermined pressure is established within said tank by a generation of gas, and an adjustable friction producing packing disposed about said rod for regulating its freedom of movement and thus controlling the pressure at which said rod will operate as a piston to separate the gas producing ingredients.

2. An apparatus for generating a fumigating gas comprising, a tank adapted to contain a liquid gas producing ingredient, a cover for said tank having a vertically disposed elongated bearing, a vertically movable piston forming rod disposed in said bearing, the diameter of said rod being so proportioned that it will act as a piston and move upwardly in said bearing when a predetermined pressure is established within said tank by a generation of gas, an adjustable friction producing packing disposed about said rod for regulating its freedom of movement and thus controlling the pressure at which said rod will move upwardly as a piston, and a basket like receptacle for holding a second gas producing ingredient having an inverted conical shape secured at its apex to the end of said rod, whereby the rate of withdrawal of the second gas producing ingredient will decrease as the rod moves upwardly.

3. An apparatus for generating a fumigating gas comprising, a tank adapted to contain a liquid gas producing ingredient, a cover for said tank having a vertically disposed elongated bearing, a vertically movable rod disposed in said bearing, a basket like receptacle secured at its bottom to the end of said rod for containing a second gas producing ingredient, the diameter of said rod having an enlarged piston forming portion where it passes through said elongated bearing, whereby said enlarged portion will act as a piston to raise the basket like receptacle when a predetermined pressure is established within said tank by a generation of gas, and an adjustable friction producing packing disposed about the enlarged portion of said rod for regulating its freedom of movement and thus controlling the pressure at which it will operate as a piston to separate the gas producing ingredients.

4. An apparatus for generating a gas for fumigating purposes comprising, a sealed container adapted to hold a liquid gas producing ingredient, a perforated partition extending across said container above said liquid and adapted to hold a quantity of a solid gas producing ingredient, a piston like support for said perforated partition extending through the end of said container and having means whereby said perforated partition may be lowered in said container to submerge the solid gas producing ingredient in the liquid gas producing ingredient, the diameter of said piston like support where it passes through the wall of said container being such that it will form a piston area sufficient to raise said perforated partition with the solid gas producing ingredient from the liquid gas producing ingredient when the pressure within said container due to the generation of gas reaches a predetermined value, an outlet conduit having a valve for controlling the discharge of the gas generated within said container, and means associated with said piston like support for operating said valve when the support is moved in response to the pressure within said container.

JAMES J. REID.